(12) United States Patent
Iliev et al.

(10) Patent No.: US 8,710,378 B1
(45) Date of Patent: Apr. 29, 2014

(54) PORTABLE, SINGLE MEMBER HOUSING CORD PROTECTOR

(75) Inventors: Pepa A. Iliev, Stow, OH (US); Vall A. Iliev, Stow, OH (US)

(73) Assignee: Martin House Group LLC, Stow, OH (US)

( * ) Notice: Subject to any disclaimer, the term of this patent is extended or adjusted under 35 U.S.C. 154(b) by 86 days.

(21) Appl. No.: 13/438,178

(22) Filed: Apr. 3, 2012

(51) Int. Cl.
 *H05K 5/02* (2006.01)
(52) U.S. Cl.
 USPC ............ 174/520; 174/50.5; 174/91; 438/528
(58) Field of Classification Search
 USPC ........ 174/91, 82, 520; 439/18, 528; 24/115 A
 See application file for complete search history.

(56) References Cited

U.S. PATENT DOCUMENTS

| | | | |
|---|---|---|---|
| 2,472,986 A | 6/1949 | Reder, Jr. | |
| 4,984,685 A | 1/1991 | Douglas | |
| 6,056,226 A | 5/2000 | Green | |
| 6,099,340 A | 8/2000 | Florentine | |
| 6,250,946 B1 | 6/2001 | Tardy | |
| 6,273,354 B1 | 8/2001 | Kovacik et al. | |
| 6,878,007 B1 | 4/2005 | Decker | |
| 6,968,955 B2 | 11/2005 | Steeber | |
| 7,317,162 B2 | 1/2008 | Kaady | |
| 8,353,719 B2 * | 1/2013 | Watts | 439/528 |
| 2010/0147580 A1 | 6/2010 | Koesterich | |

* cited by examiner

*Primary Examiner* — Dhirubhai R Patel
(74) *Attorney, Agent, or Firm* — John D. Gugliotta

(57) ABSTRACT

A molded portable single-member housing assembly for securing and protecting elongated elements having an aesthetically pleasing design is provided. The molded portable single-member housing assembly having a lid and a depressed housing portion connected via a live hinge. The lid is engaged by a user via an aperture which permits the user to physically manipulate the lid rotatably about a hinge axis. The elongated element is store or housed within the base portion and permitted access out of the housing via at least two indentions. Further, the molded portable single-member housing assembly has at least four legs.

13 Claims, 4 Drawing Sheets

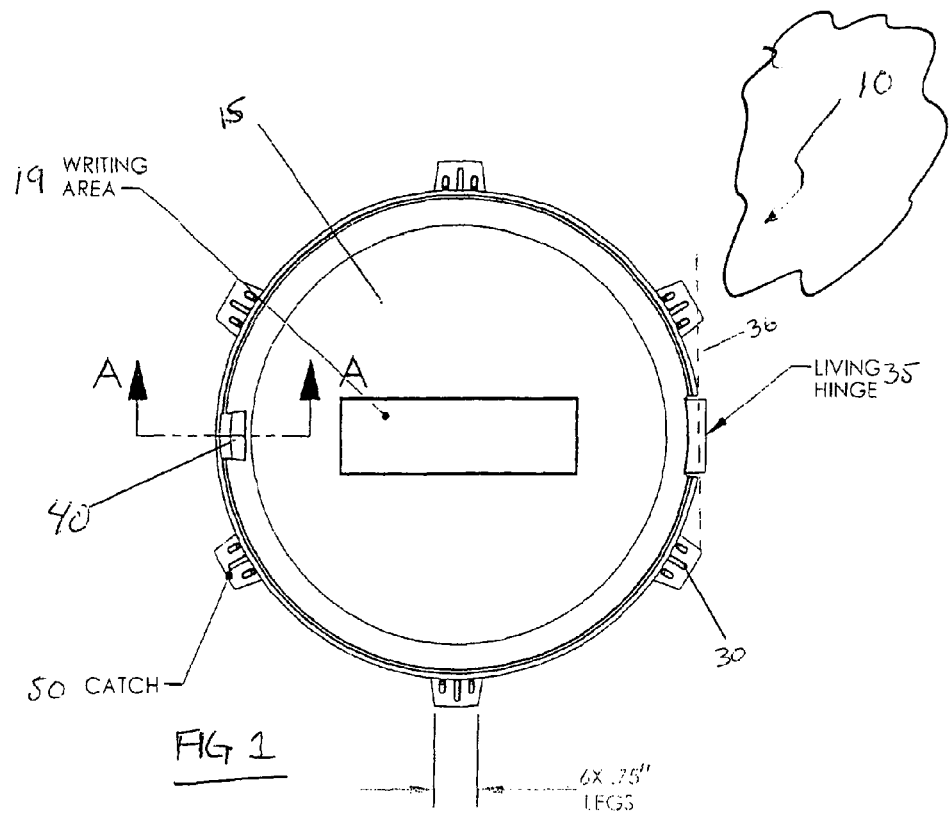
FIG 1
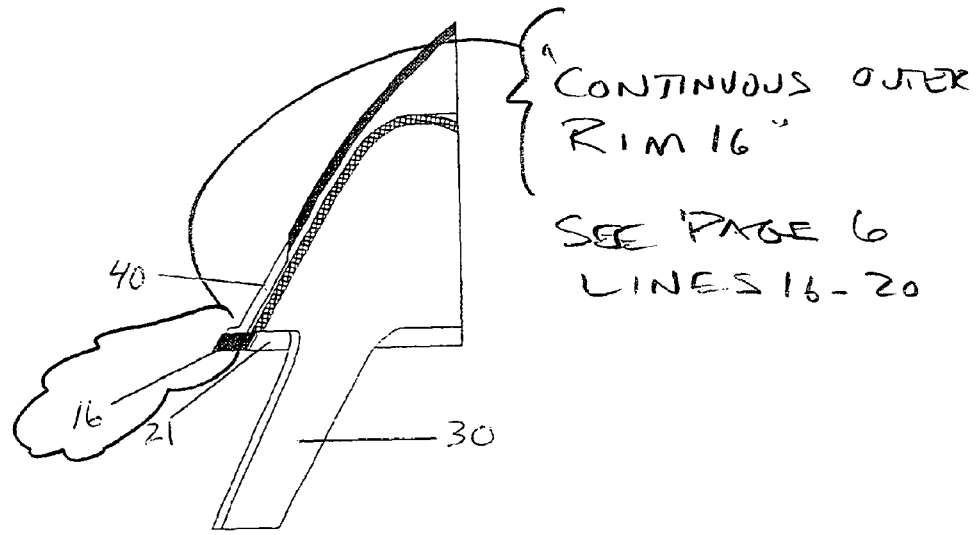
FIG 2  SECTION A-A
CATCH DETAIL

SECTION VIEW WITH CORDS

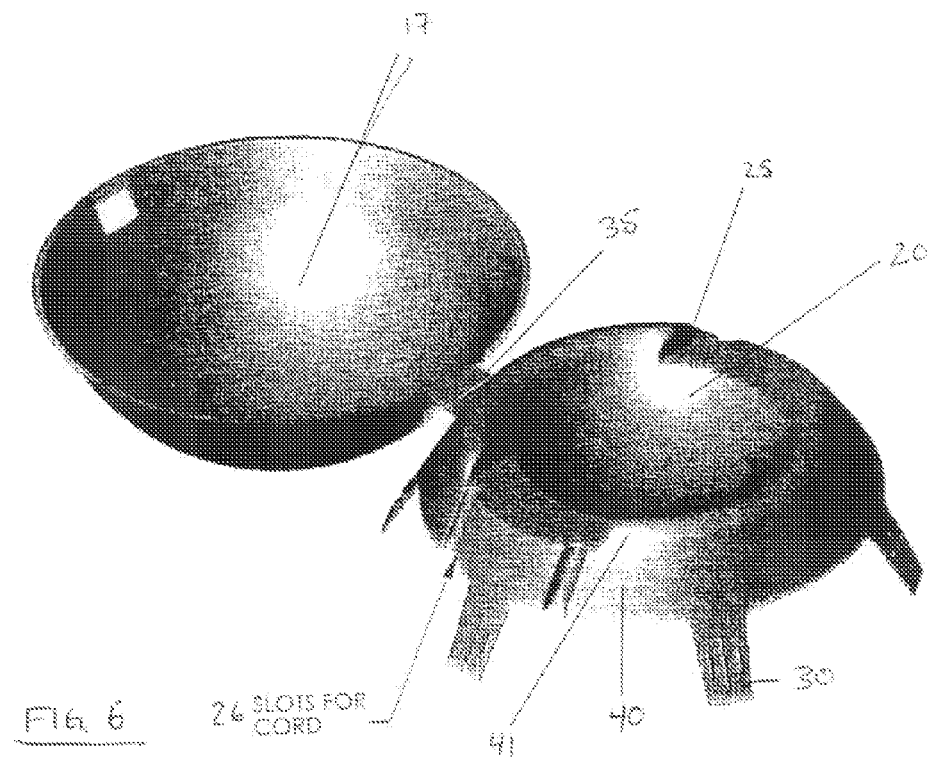
FIG. 6  26 SLOTS FOR CORD
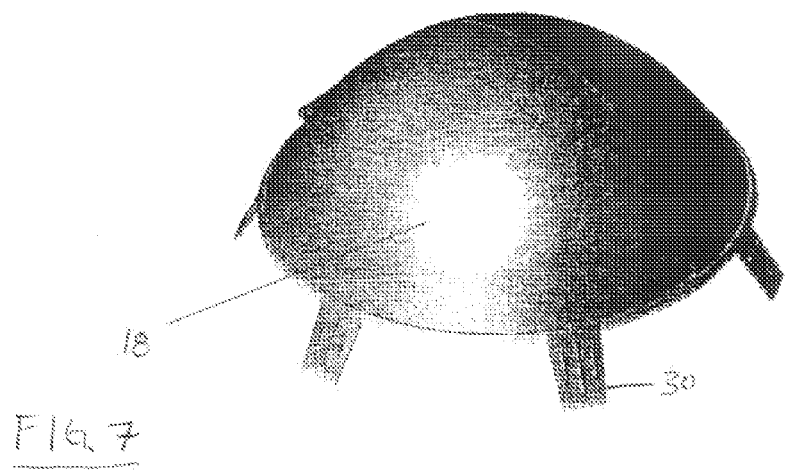
FIG. 7

PORTABLE, SINGLE MEMBER HOUSING CORD PROTECTOR

RELATED APPLICATIONS

None.

BACKGROUND OF THE INVENTION

1. Field of the Invention

The present invention relates generally to housing devices for elongated elements to protect said elongated elements from their surroundings and more specifically, to an aesthetically pleasing, portable single-member housing assembly to protect an electrical extension cord.

2. Description of the Related Art

Many different devices have been developed to assist users in keeping and protecting their electrical cords. Anyone that has ever used an electrical extension cord in lengths exceeding twenty five feet understands the difficulty of protecting the cord from the environment and further neatly storing the cord out of the way of nearby persons.

In storing the electrical cord, homeowners will sometimes simply wind up the electrical cord and hang it on a hook in the garage. However, this does not protect the cord from the surrounding elements and it is further unsightly and unappealing to the homeowner.

One way this is overcome is by using winding assemblies that are mounted to the wall and allow the electrical cord to be reeled and wound up. However these mounted assemblies have drawbacks because they are not portable. Portability is a key component of an electric extension cords. The cords must travel from the nearest electrical outlet to the desired unelectrified or unwired workspace.

Other prior art approaches have attempted to solve this by creating portable cord caddies shown, however these are generally designed for commercial use, such as to assist a contractor in their manufacturing or repair duties. They are usually utilitarian and intended for these specific professional contractors, they do not have aesthetically pleasing features. Further, they are generally not molded from a single member, they usually consist of a container and a lid.

While some patents have overcome some of the problems noted abvope, they do not overcome all of the problems, and further, fall short in meeting the needs of the "weekend warrior" homeowner who are seeking to protect elongated elements via a practical and aesthetically pleasing, portable single-member housing container for protecting and storing and electrical cord.

SUMMARY OF THE INVENTION

It is an object of the present invention to provide a housing devices for elongated elements to protect said elongated elements from their surroundings It is a feature of the present invention to provide an aesthetically pleasing, mushroom shaped portable single-member housing assembly to protect an electrical cord.

Briefly described according to the preferred embodiment with the present invention, a portable single-member housing intended to protect an elongated element placed inside of the housing from the surrounding element, while providing an aesthetically pleasing appearance. The single-member housing employs a single body created from molded rubber or plastic, and formed in a way that moving components cooperate and mate to create different portions of the housing while remaining connected as a single molded material.

An advantage of the present invention is that it is lightweight and easily transportable by the owner as it may be picked up and moved to a desired location.

Another advantage of the present invention is its aesthetically pleasing designing which allows the owner to display the single-member housing without the unsightliness of having an otherwise conventional utilitarian extension cord housing in plain sight for others to observe.

These and other object of the present invention are attained by various embodiments incorporating the teachings of the present invention.

DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 1 is a top plan view of the molded portable single-member housing assembly according to the preferred embodiment of the present invention;

FIG. 2 is a section detail across segment A-A as depicted in FIG. 1;

FIG. 6 is a perspective view of the molded portable single-member housing assembly, shown with the cover lid in the open position; and FIG. 7 is a perspective view of the molded portable single-member housing assembly, shown with the cover lid in the closed position.

DESCRIPTION OF THE PREFERRED EMBODIMENT

The following detailed description illustrates by way of example and not by way of limitation. This description will clearly enable one skilled in the art to make and use the invention, and describes several embodiments, adaptations, variations, alternatives and uses of the invention, including what is currently believed to be the best mode of carrying out the invention.

Throughout this entire application, it will be understood that the term "elongated element" includes such products as an electric extension cord, hose, wire, or any kind of elongated element which is desirably wound, housed, and stored as well as unwound relative to itself in a portable single member molded rubber housing.

It is further understood that the present invention is not to be limited by design, shape or size of the portable single member molded rubber housing.

Figure 3:
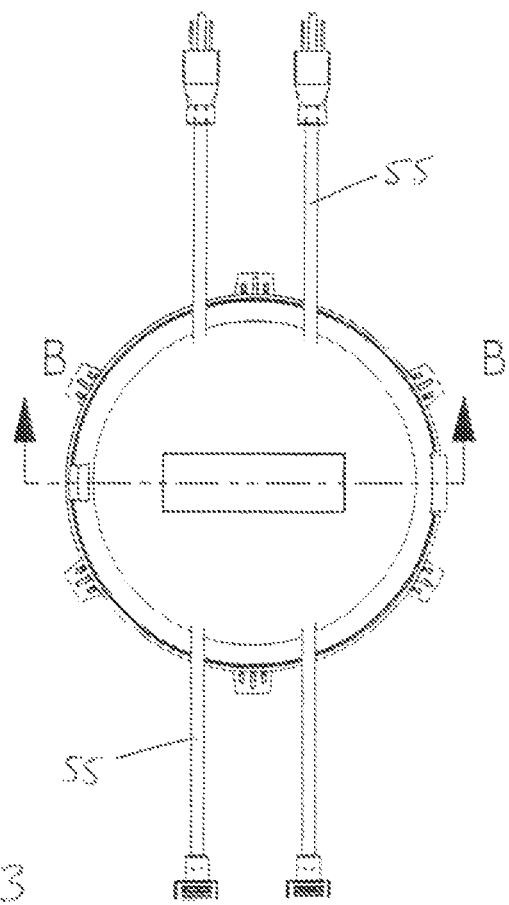
FIG. 3 is a top plan view of the molded portable single-member housing assembly shown with electrical extension cords extending through said molded portable single-member housing assembly.
Figure 4:
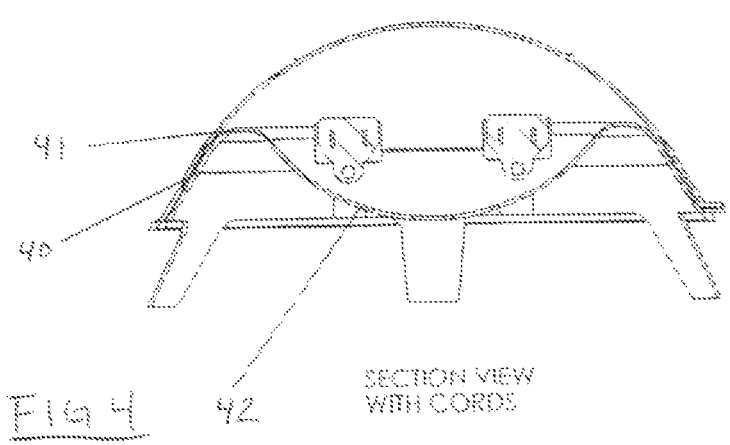
FIG. 4 is a section detail across segment B-B as depicted in FIG. 3 shown with cords extending through said molded portable single-member housing assembly.
Figure 5:
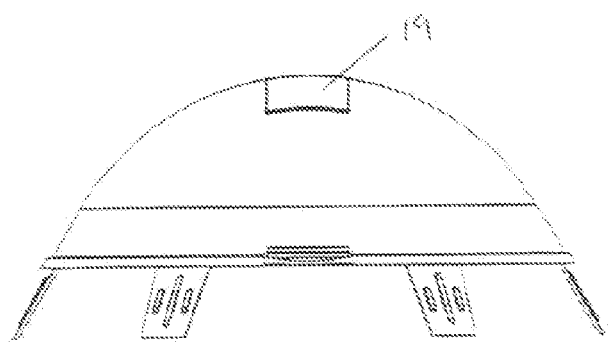
FIG. 5 is an elevation view of said molded portable single-member housing assembly.

Referring now to the FIGS. 1-7, it will be seen that the mushroom cord protector of the present invention is a portable single member molded housing 10. The single molded member 10 is one piece that comprises a plurality of connected and cooperating components. The single molded member 10 is anticipated to be molded from a single and continuous piece of material. The material will likely be rubber or plastic, however other conventionally accepted materials may also be used.

The single molded member 10 comprises a cover lid 15, a depressed housing 20, at least two recessed indentions 25, and legs 30. The cover lid 15 and the depressed housing 20 are physically connected via a live hinge 35.

When the lid 15 is closed, the single molded member 10 is generally hemispherical in shape and oriented in a manner that the planar circular portion is parallel to the surface on the single mold member 10 is atop.

The cover lid 15 is also hemispherical in shape. The cover lid 15 may be opened and disengaged from the depressed housing 20 or closed and engaging the depressed housing 20 as a result of physical manipulation. When the cover lid 15 is open and disengaged from the depressed housing 20 it is the shape of a bowl. When the cover lid 15 is closed and mating or engaging with the depressed housing 20 it is the shape of a dome or mushroom top The cover lid 15 comprises a live hinge 35 and an aperture 40. Said live hinge 35 and aperture 40 are approximately linearly related on the same line that intersects the cross-sectional perimeter of the hemispherically shaped cover lid. It is anticipated that the aperture 40 will be directly across the cover lid 15 from the live hinge 35. The live hinge 35 is in direct physical connection with the depressed housing 20.

The cover lid 15 includes a circumferentially continuous outer rim 16 which is adapted to matingly engage an inner rim 21 circumferentially continuous to the depressed housing 20. The outer rim 16 is sufficiently flexible to cover the inner rim 21 of the single member molded housing 10 for cooperative mating engagement therewith, as shown in FIG. 2 of the drawings The cover lid 15 further includes an interior concave surface 17 and an exterior convex surface 18. It is anticipated that both of these surface will have a smooth finish however molded designs and textures are available. The exterior convex surface may have a writing area 19. The writing area 19 may be a cut out or partially geometrically removed or recessed portion of the exterior convex surface so as to create a distinct zone or area where a person's vision will be intentionally engaged. It is anticipated that the writing area 19 will have the shape of a rectangle. The length of the writing area 19 rectangle is expected to be linearly parallel with the linear relationship line created by the alignment of the live hinge 35 and the aperture 40.

The live hinge 35 has a rotating axis 36. The rotating axis 36 of the live hinge 35 is parallel to the surface on which the single molded member 10 is atop and perpendicular to the line that intersects the cross-sectional circumferential perimeter of the hemispherically shaped cover lid 15, on which the live hinge 35 is in linear orientation with the aperture 40. The live hinge 35 permits the cover lid 15 to rotatably pivot about rotating axis 36.

Since the portable single member molded housing 10 is constructed of a solid molded piece of material, the live hinge 35 operates and rotates using unique molded design to instigate the folding or rotating action upon physical manipulation as opposed to an ordinary door hinge which requires two plates pinned together via supports.

The aperture 40 is anticipated to be large enough for a user to insert at least one finger into said aperture 40. By allowing a person to insert at least one finger, the aperture 40 acts as a contact point for the person to urge the cover lid 15 by physical manipulation to rotate about the rotating axis 36 of the live hinge 35. Effectively allowing the person to open or close the cover lid 15.

As previously stated, the depressed housing 20 is physically connected via the live hinge 35 to the cover lid 15. The depressed housing 20 shaped is best described as having a continuous circumferential housing sidewall 40 which tapers inward and upward toward an imaginary apex point. Connected to the top of the housing sidewall 40 is a continuous circumferential convex housing portion 41 which shapes a portion of the depressed housing 20. The circumferential convex housing portion 41 then continues on to create and form the depressed portion 42 of the depressed housing 20.

Another means of expressing the shape of the depressed housing 20 is by describing the shape in terms of Calculus. In Calculus, there is a method known as "the method of cylindrical shells." This allows for volume of variably shaped objects to be calculated through means of integration. The method allows for volume of objects to be determined by rotating the object around an axis. The shape of the depressed housing 20 is similar to the shape created when the volume of an object must be obtained by rotating about the y-axis the region bounded by $$y=\sin(\tfrac{1}{2}X)+1 \text{ and } y=0.$$

The x axis integration limits be bound from 0 to $3^\pi$. 3-D graphing the following formula in a computer module would yield a shape similar to the shape in FIGS. 1 and 2. So the formula would appear as:

$$V = \int_0^{3\pi} (2\pi * x)\left[\sin\left(\frac{x}{2}+1\right)\right]dx.$$

Integrated into the continuous circumferential convex housing portion 41 are at least two indentions 25. The indentions 25 operate to permit an elongate element access to the depressed portion 42 of the depressed housing 20.

Integrated into the continuous circumferential housing sidewall 40 are at least two slots 26. The at least two slots 26 permits ingress and egress into the depressed housing 20 when the cover lid 15 is closed. The at least two slots 26 are connected to and function with the at least two indentions 25.

Permanently connected the bottom of the continuous circumferential housing sidewall 40 are at least four legs 30. An alternative embodiment as shown in FIGS. 1-7, shows the mushroom cord protector having 1000 six legs 30. The legs are anticipated as being three-quarters inch wide (0.75") however, this may be adjusted appropriately to adequately support the molded portable single-member housing assembly 10.

Attached and integrated into at least on leg 30 is a catch 50. The catch 50 operates to releasably secure the cover lid 15 when it is closed and engaging the depressed housing 20.

From the foregoing it will now be appreciated that the portable mushroom cord protector of the present invention enables an elongated element 55 to be inserted into the depressed portion 42 and wrapped in a coil formation with each end of the elongated element traveling through the indentions 25. Thus the elongated element 55 can be stored in a protected environment, without subjecting the elongated element to the outside weather possibly resulting in damage. The portable mushroom cord protector may be easily moved to any location desired.

The foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A portable, single molded member, elongated element container comprising:
    a hemispherical cover lid having a convex outer surface and a concave inner surface;
    said cover lid having an aperture and a live hinge, wherein said aperture and said hinge are linearly arranged along a line that circumferentially intersects said hemispherical lid, said hinge forming a rotational connection between said cover and a hemispherical depressed housing;
    said cover lid having a writing area, wherein said writing area is a geometrically recessed region contained on said convex outer surface;
    said aperture being sufficient for and adapted to allow insertion of at least one finger of a user for urging said cover lid about a rotation axis formed from said live hinge.

2. The portable, single molded member, elongated element container of claim 1, further comprising:
    said hemispherical depressed housing having a continuous circumferential housing sidewall, wherein said continuous circumferential housing sidewall tapers inward and upward;
    said hemispherical depressed housing having a continuous circumferential convex housing portion connected to said continuous circumferential housing sidewall; and
    said hemispherical depressed housing having a depressed portion connected to said continuous circumferential convex housing portion, wherein the depressed portion receives an elongated element.

3. The portable, single molded member, elongated element container of claim 2, further comprising:
    at least four legs, wherein said legs are connected to said continuous circumferential housing sidewall.

4. The portable, single molded member, elongated element container of claim 3, further comprising:
    said live hinge connecting said cover lid and said depressed portion.

5. The portable, single molded member, elongated element container of claim 2, further comprising:
    said live hinge connecting said cover lid and said depressed portion.

6. A cord protector comprising:
    a molded portable single-member housing assembly for securing and protecting elongated elements having an aesthetically pleasing design;
    a depressed housing portion formed in said housing; and
    a lid for covering said depressed housing portion and affixed to said housing connected via a live hinge;
    wherein said lid is adapted to be engaged by insertion of at least one finger of a user via an aperture formed by said lid which permits the user to physically urge the lid rotatably about a hinge axis.

7. The cord protector of claim 6, wherein the elongated element is store or housed within the base portion and permitted access out of the housing via at least two indentions.

8. The cord protector of claim 7, further comprising at least four legs affixed to and vertically depending from said housing.

9. A cord protector comprising:
    a hemispherical cover lid having a convex outer surface and a concave inner surface;
    said cover lid having an aperture and a live hinge, wherein said aperture and said hinge are linearly arranged along a line that circumferentially intersects said hemispherical lid, said hinge forming a rotational connection between said cover and a hemispherical depressed housing; and
    said aperture being sufficient for and adapted to allow insertion of at least one finger of a user for urging said cover lid about a rotation axis formed from said live hinge;
    wherein when said cover lid is in a closed position over said housing said cord protector forms an overall appearance of an aesthetic mushroom shaped design.

10. The cord protector of claim 9, wherein said hemispherical depressed housing forms a single molded elongated container member.

11. The cord protector of claim 10, wherein said single molded elongated container member further comprises a continuous circumferential housing sidewall.

12. The cord protector of claim 10, further comprising at least four legs, wherein said legs are connected to said continuous circumferential housing sidewall.

13. The cord protector of claim 9, wherein said cover lid further comprises a writing area, wherein said writing area is a geometrically recessed region contained on said convex outer surface.

* * * * *